(12) United States Patent
Zhu et al.

(10) Patent No.: US 11,517,850 B2
(45) Date of Patent: Dec. 6, 2022

(54) AIR SEPARATION DEVICE AND REFRIGERATING AND FREEZING DEVICE

(71) Applicant: QINGDAO HAIER JOINT STOCK CO., LTD., Qingdao (CN)

(72) Inventors: Xiaobing Zhu, Qingdao (CN); Bo Jiang, Qingdao (CN); Lei Wang, Qingdao (CN); Hao Zhang, Qingdao (CN); Jing Wang, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 805 days.

(21) Appl. No.: 16/466,293

(22) PCT Filed: Dec. 1, 2017

(86) PCT No.: PCT/CN2017/114219
§ 371 (c)(1),
(2) Date: Jun. 3, 2019

(87) PCT Pub. No.: WO2018/099464
PCT Pub. Date: Jun. 7, 2018

(65) Prior Publication Data
US 2020/0061529 A1    Feb. 27, 2020

(30) Foreign Application Priority Data
Dec. 2, 2016 (CN) .......................... 201611109706.7

(51) Int. Cl.
*B01D 53/22* (2006.01)
*A23L 3/3418* (2006.01)
(Continued)

(52) U.S. Cl.
CPC .......... *B01D 53/228* (2013.01); *A23L 3/3418* (2013.01); *B01D 63/087* (2013.01);
(Continued)

(58) Field of Classification Search
None
See application file for complete search history.

(56) References Cited

U.S. PATENT DOCUMENTS

| 11,150,007 B2 * | 10/2021 | Zhu ...................... B01D 53/228 |
| 2007/0107594 A1 * | 5/2007 | Piccinini ................ B01D 53/22 95/52 |

(Continued)

FOREIGN PATENT DOCUMENTS

| CN | 2608114 Y | 3/2004 |
| CN | 2697545 Y | 5/2005 |

(Continued)

OTHER PUBLICATIONS

English language machine translation for CN 201251336 Y. Retrieved from translationportal.epo.org on Apr. 20, 2021. (Year: 2021).*

*Primary Examiner* — Jason M Greene
(74) *Attorney, Agent, or Firm* — Cheng-Ju Chiang (57) ABSTRACT

An air separation device and a refrigerating and freezing device. The air separation device comprises a support frame and an air separation membrane, wherein a supporting surface with a channel and an enriched-gas collection chamber communicated with the channel are formed in the support frame. The air separation membrane laid on the support surface of the support frame and configured to enable more of a specific gas than other gases in airflow of the space around the air separation device to enter the enriched-gas collection chamber through the air separation membrane. According to the air separation device provided by the present invention, the support frame is specially designed to adopt the structure provided with the support surface and the enriched-gas collection chamber, the channel communicated with the enriched-gas collection chamber is formed on the support surface, and the air separation membrane is disposed on the support surface.

8 Claims, 6 Drawing Sheets

(51) Int. Cl.
  *B01D 63/08* (2006.01)
  *F25D 11/02* (2006.01)
  *F25D 17/04* (2006.01)

(52) U.S. Cl.
  CPC ............ *F25D 11/02* (2013.01); *F25D 17/042* (2013.01); *A23V 2002/00* (2013.01); *B01D 2053/222* (2013.01); *F25D 2317/041* (2013.01)

(56) References Cited

U.S. PATENT DOCUMENTS

2015/0021260 A1*  1/2015  Iwai .................... B01D 63/084
                                                210/486
2015/0314241 A1* 11/2015  Hester ................ B01D 63/081
                                                210/322

FOREIGN PATENT DOCUMENTS

| | | | | |
|---|---|---|---|---|
| CN | 201251336 Y | * | 6/2009 | ............. F25D 11/00 |
| CN | 101766321 A | | 7/2010 | |
| CN | 106582216 A | | 4/2017 | |
| CN | 106693623 A | | 5/2017 | |
| CN | 206350980 U | | 7/2017 | |
| CN | 206355797 U | | 7/2017 | |
| CN | 206362070 U | | 7/2017 | |
| CN | 206514590 U | | 9/2017 | |
| CN | 107436067 A | | 12/2017 | |
| CN | 206695495 U | | 12/2017 | |
| JP | 2014-59075 A | | 4/2014 | |

* cited by examiner

AIR SEPARATION DEVICE AND REFRIGERATING AND FREEZING DEVICE

CROSS-REFERENCE TO RELATED APPLICATION

The present application is a 35 U.S.C. § 371 National Phase conversion of International (PCT) Patent Application No. PCT/CN2017/114219, filed on Dec. 1, 2017, which claims the priority of Chinese Patent Application No. 201611109706.7, filed on Dec. 2, 2016, and entitled "Air Separation Device and Refrigerating and Freezing Device", the content of which is incorporated herein by reference in its entirety. The PCT International Patent Application was filed and published in Chinese.

TECHNICAL FIELD

The present invention relates to the field of gas separation technology, and in particular to an air separation device and a refrigerating and freezing device.

BACKGROUND

A refrigerator is a refrigerating device that keeps a constant low temperature, and is also a civilian product that keeps food or other articles in a constant-low-temperature cold state. With the improvement of life quality, consumers demand more and more on freshness-keeping of stored food, especially, the color, taste, etc. of food. Thus, the stored food shall be guaranteed to keep their color, taste, freshness, etc. unchanged as much as possible during storage.

In the freshness-keeping technology of the refrigerator, oxygen is closely related to oxidation and respiration of food in the refrigerator. The slower the food breathes, the lower the oxidation speed of the food is, and the longer the freshness-keeping time is. Thus reduction of the content of oxygen in air has a significant impact on freshness-keeping of the food.

Currently, in order to reduce the content of oxygen in the refrigerator, vacuum freshness-keeping is generally used or a deoxidating device is additionally provided for low-oxygen freshness-keeping in the prior art. However, vacuum freshness-keeping is usually troublesome in operation and inconvenient to use. The deoxidating device generally utilizes an electrolyte, etc. for oxygen removal, and is relatively complicated and not obvious in deoxidating effect.

The air-conditioning freshness-keeping technology generally refers to the technology for prolonging the food storage life by regulating a gas atmosphere (the proportion of gas compositions or gas pressure) in a closed space where stored articles are located, and it has the following basic principle: in a certain closed space, a gas atmosphere in which the gas compositions are different from normal air compositions, is obtained by various regulation modes to inhibit a physiological and biochemical process and microbial activities, which cause spoilage of the stored articles (generally food). Particularly, in this present application, the discussed air-conditioning freshness-keeping technology is an air-conditioning freshness-keeping technology that specially regulates the proportion of gas compositions.

It is known to those skilled in the art that the normal air compositions include (according to percentage by volume, hereinafter the same): about 78% of nitrogen, about 21% of oxygen, about 0.939% of rare gases (helium, neon, argon, krypton, xenon and radon), 0.031% of carbon dioxide, and 0.03% of other gases and impurities (e.g., ozone, nitric oxide, nitrogen dioxide and vapor). In the field of air-conditioning freshness-keeping, a nitrogen-rich oxygen-lean freshness-keeping gas atmosphere is usually obtained by filling a closed space with a nitrogen-rich gas to reduce the content of oxygen. Here, it is known to those skilled in the art that the nitrogen-rich gas refers to a gas in which the content of nitrogen exceeds the content of nitrogen in normal air, for example, the content of nitrogen may be 95%-99% or even above, and the nitrogen-rich oxygen-lean freshness-keeping gas atmosphere refers to a gas atmosphere in which the content of nitrogen exceeds that in normal air and the content of oxygen is lower than that in normal air.

The history of the air-conditioning freshness-keeping technology can date back to 1821 when German biologists discovered that fruits and vegetables could reduce metabolism at a low oxygen level. But until now, due to the large size and high cost of a nitrogen generating device traditionally used for air-conditioning freshness-keeping, this technology is basically limited to various large-scale special storehouses (their storage capacities are generally at least 30 tons above). So to speak, a technical problem that those skilled in the field of air-conditioning freshness-keeping have been eager to solve but has not successfully solved is that what kind of appropriate gas-conditioning technology and corresponding device may be adopted to economically minimize and silence an air-conditioning system to make it applicable to families or individual users.

SUMMARY

According to the first aspect of the present invention, an objective is to provide an air separation device to separate a specific gas from air so as to avoid the above-mentioned defect in the prior art.

According to the first aspect of the present invention, a further objective is to provide an air separation device suitable for use in a refrigerating and freezing device to reduce the content of a specific gas in a storage space of the refrigerating and freezing device.

According to the first aspect of the present invention, another further objective is to provide an air separation device that is small in size, high in strength and obvious in deoxidizing effect.

According to the second aspect of the present invention, an objective is to provide a refrigerating and freezing device to overcome at least one defect of a conventional refrigerator, and creatively propose that oxygen in air inside a space is discharged out of the space by an air separation device, such that a nitrogen-rich oxygen-lean gas atmosphere is obtained in the space to facilitate freshness-keeping of food. In this gas atmosphere, aerobic respiration intensity of fruits and vegetables is reduced by reducing the content of oxygen in a fruit and vegetable storage space. Meanwhile, a basic respiration function is guaranteed to prevent the fruits and vegetables from anaerobic respiration. Thus, the fruits and vegetables are kept fresh for a long time.

According to the first aspect, there is provided an air separation device, including:

a support frame on which a support surface with a channel and an enriched-gas collection chamber communicated with the channel are formed; and an air separation membrane laid on the support surface of the support frame and configured to enable more of a specific gas than other gases in airflow in the space around the air separation device to enter the enriched-gas collection chamber through the air separation membrane.

Optionally, the support frame includes an air extraction hole communicated with the enriched-gas collection chamber to allow the specific gas in the enriched-gas collection chamber to be output.

Optionally, the support frame further includes:
a side frame in which a receiving chamber with an opening is defined; and
a plurality of ribbed plates disposed at intervals at the opening of the receiving chamber.

Outer side surfaces of the plurality of ribbed plates form the support surface.

A gap between two adjacent ribbed plates forms the channel.

A cavity, located at the inner sides of the plurality of ribbed plates, of the receiving chamber forms the enriched-gas collection chamber.

Optionally, the air extraction hole is formed in the circumferential side of the side frame. An axis of the air extraction hole is on a perpendicular bisection plane of the support surface.

Optionally, the axis of the air extraction hole and the plurality of ribbed plates extend in the same direction.

Optionally, the axis of the air extraction hole and inner side surfaces of the plurality of ribbed plates are located on the same plane.

Optionally, the air extraction hole protrudes outwards from the support surface. The air extraction hole is opposite to two ribbed plates. The outer side surfaces, close to the air extraction hole, of the two ribbed plates are upraised outwards to form bulges. The two bulges form a flow guide channel aligned with the air extraction hole to increase air inflow of the air extraction hole.

Optionally, a surface at the periphery of the opening of the side frame sinks to be flush with the support surface so as to form a mounting groove into which the air separation membrane is embedded. The surface at the periphery of the opening of the side frame further sinks at the rim of the mounting groove to form a round of annular groove for being filled with a sealant, such that the air separation membrane is mounted in the mounting groove in a sealed manner.

Optionally, the air separation membrane is an oxygen-enriching membrane. The specific gas is oxygen.

According to the second aspect of the present invention, there is provided a refrigerating and freezing device, including:
a cabinet with a storage space defined therein, wherein an air-conditioning freshness-keeping space is formed in the storage space;
any of the above-described air separation devices; and
an air pump of which an inlet end is communicated with the enriched-gas collection chamber of the air separation device through a pipeline to extract and discharge a gas that permeates into the enriched-gas collection chamber out of the air-conditioning freshness-keeping space.

According to the air separation device provided by the present invention, the support frame is specially designed to adopt the structure provided with the support surface and the enriched-gas collection chamber. The channel communicated with the enriched-gas collection chamber is formed on the support surface. The air separation membrane is disposed on the support surface. Thus, the air separation device having excellent integral gas fluidity and certain strength is provided.

Further, since the plurality of ribbed plates is disposed at intervals at the opening of the receiving chamber of the support frame and the air separation membrane is disposed on the outer side surfaces of the ribbed plates, on one hand, the continuity of the flow guide channel is guaranteed, and on the other hand, the size of the support frame is reduced, and the strength of the support frame is enhanced. Besides, owing to the structure of the support frame, the air separation membrane can obtain sufficient support, and maintain better flatness all the time even if negative pressure inside the enriched-gas collection chamber is relatively higher. Thus, the long service life of the air separation device is guaranteed.

Further, the location of the air extraction hole is specially designed, such that air inflow of the air extraction hole is increased, and the air guiding rate of the air separation device is increased. Thus, the size of the enriched-gas collection chamber can be greatly reduced, which facilitates minimization of the air separation device.

Further, as the mounting groove and the annular groove are formed in the side frame of the support frame, the air separation membrane can be conveniently, quickly and reliably mounted on the support frame, and the air tightness of the air separation device is guaranteed.

Through the following detailed description of the specific embodiments of the present invention with reference to the drawings, those skilled in the art will understand the above and other objectives, advantages and features of the present invention more clearly.

BRIEF DESCRIPTION OF THE DRAWINGS

The followings will describe some specific embodiments of the present invention in detail in an exemplary rather than restrictive manner with reference to the accompanying drawings. The same reference signs in the drawings represent the same or similar components or parts. Those skilled in the art shall understand that these drawings are not necessarily drawn to scale. In the drawings.

DETAILED DESCRIPTION

Figure 1:
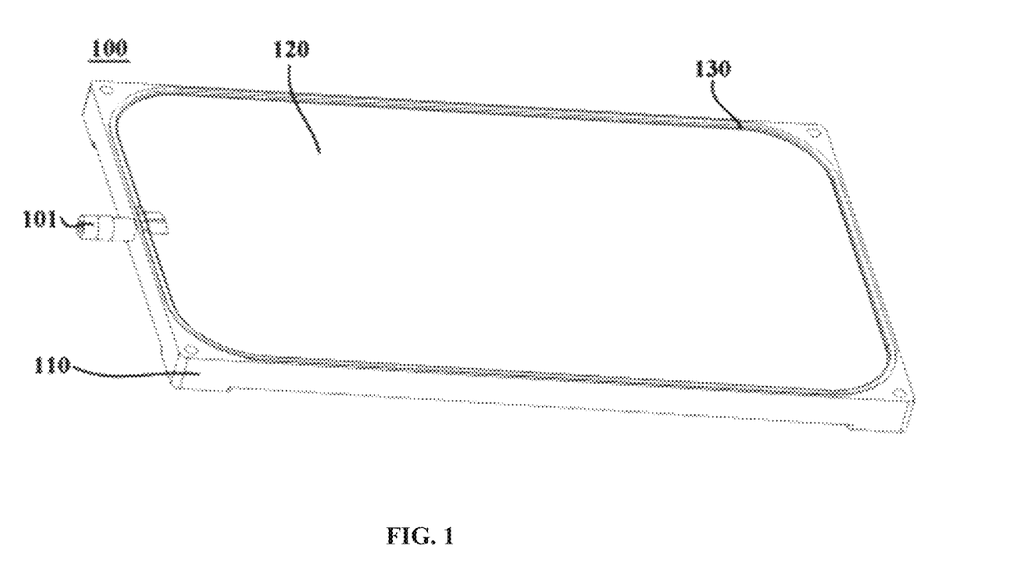
FIG. 1 is a schematic structural view of an air separation device according to one embodiment of the present invention.
Figure 2:
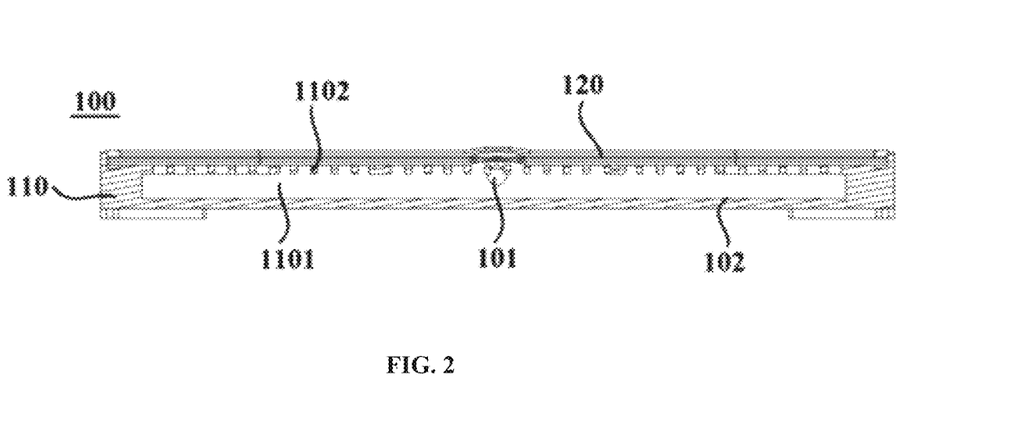
FIG. 2 is a schematic sectional view of the air separation device shown in FIG. 1.
Figure 3:
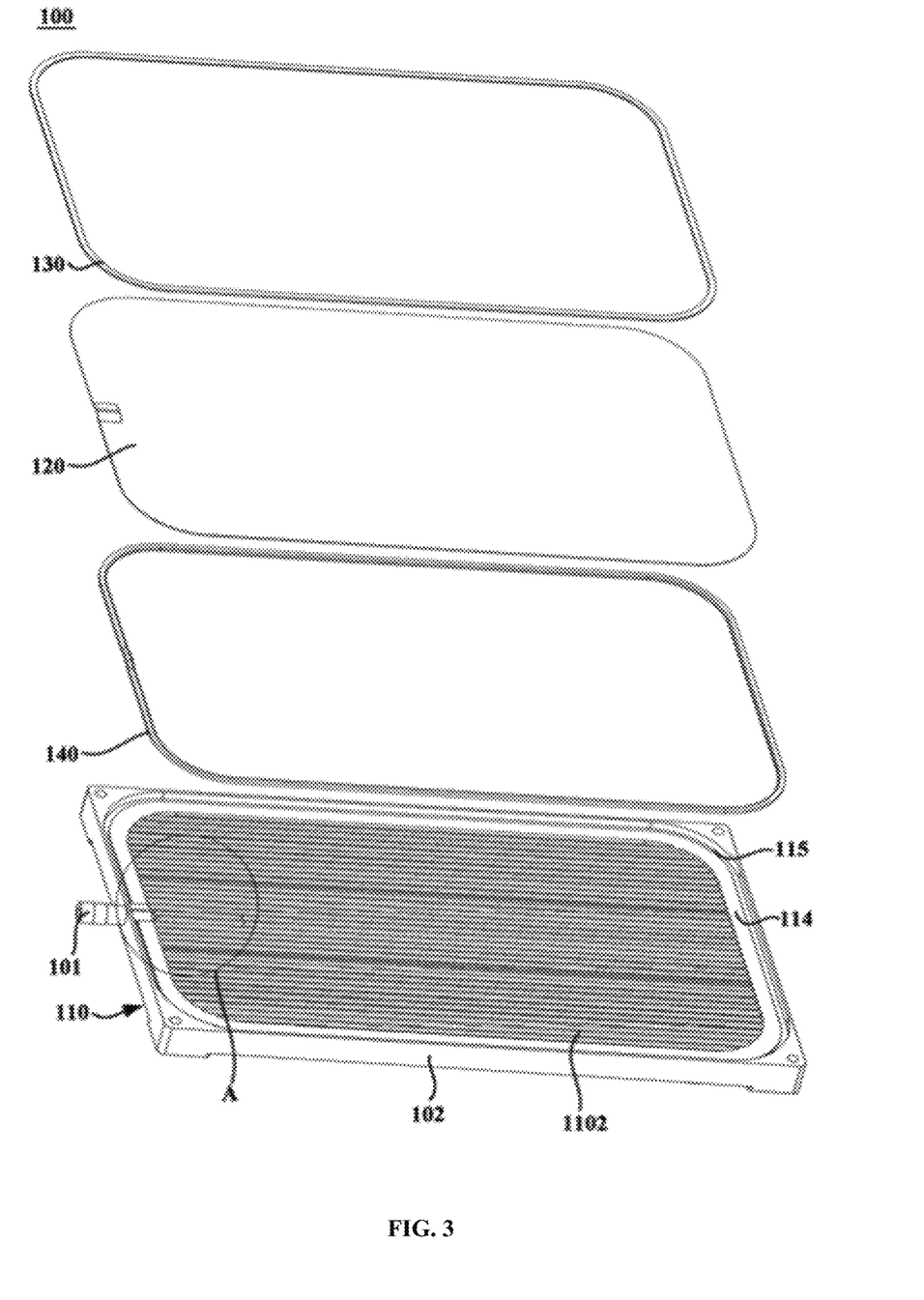
FIG. 3 is a schematic exploded view of the air separation device shown in FIG. 1.
Figure 4:
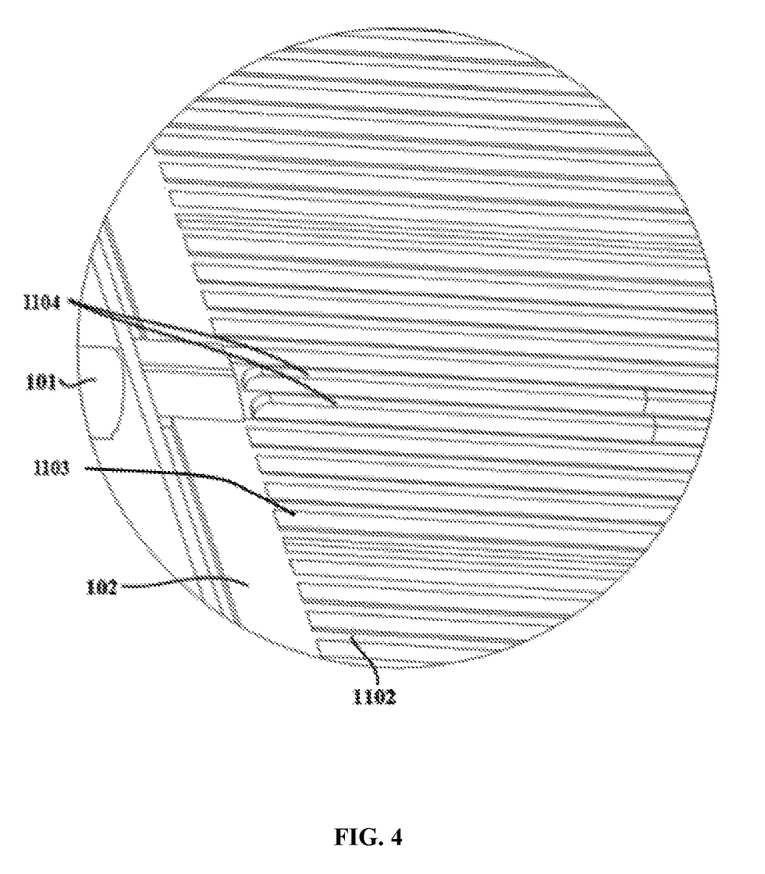
FIG. 4 is a schematic enlarged view of a region A in FIG. 3.

FIG. 1 is a schematic structural view of an air separation device 100 according to one embodiment of the present invention. FIG. 2 is a schematic sectional view of the air separation device 100 shown in FIG. 1. FIG. 3 is a schematic exploded view of the air separation device 100 shown in FIG. 1. FIG. 4 is an enlarged schematic view of a region A in FIG. 3. Referring to FIGS. 1-4, the air separation device 100 according to the embodiment of the present invention generally includes a support frame 110 and an air separation membrane 120 disposed on the support frame 110. A support surface with a channel 1103 and an enriched-gas collection chamber communicated with the channel 1103 are formed on the support frame 110. The air separation membrane 120 is laid on the support surface of the support frame 110 and configured to enable more of a specific gas than other gases in airflow of the space around the air separation device 100 to enter the enriched-gas collection chamber through the air separation membrane 120.

In some embodiments of the present invention, the air separation membrane 120 is permeable to all gases, but has different permeability to the different gases. The process that the gases permeate through the air separation membrane 120 is complicated, and its permeation mechanism generally lies in that gas molecules are adsorbed on a surface of the air separation membrane 120 for dissolution first, then diffused in the air separation membrane 120 and finally desorbed from the other side of the air separation membrane 120. The membrane separation technology depends on the difference of dissolution and diffusion coefficients of the different gases in the air separation membrane 120 to realize gas separation. Under the action of a certain driving force (a pressure difference or pressure ratio on two sides of the air separation membrane), in mixed gases, a gas (namely, the above-mentioned specific gas) with a relatively high permeation rate is enriched on a permeation side of the air separation membrane 120 after permeating through the air separation membrane 120, and a gas with a relatively low permeation rate is retained on a retaining side of the air separation membrane 120 and enriched. Thus, the mixed gases are separated.

In a preferred embodiment, the air separation membrane 120 may be an oxygen-enriching membrane. Correspondingly, the above-mentioned specific gas is oxygen. In an alternative embodiment, the air separation membrane 120 may also be a separation membrane for separating other gases, which is common in the art.

In some embodiments, the support frame 110 of the air separation device 100 may include an air extraction hole 101 communicated with an enriched-gas collection chamber to allow the specific gas in the enriched-gas collection chamber to be output. The enriched-gas collection chamber may be connected to an air pump through the air extraction hole 101 to output the specific gas from the enriched-gas collection chamber. As an enriched gas in the enriched-gas collection chamber is output, the inside of the enriched-gas collection chamber is in a negative-pressure state. Thus, the specific gas in air outside the air separation device 100 will continuously permeate through the air separation membrane 120 to enter the enriched-gas collection chamber.

In some embodiments, the support frame 110 of the air separation device 100 may further include a side frame 102 and a plurality of ribbed plates 1102. A receiving chamber 1101 with an opening is defined in the side frame 102. The plurality of ribbed plates 1102 is disposed at intervals at the opening of the receiving chamber 1101. Outer side surfaces of the plurality of ribbed plates form the support surface that allows the air separation membrane 120 to be laid thereon. A gap between two adjacent ribbed plates 1102 forms the channel 1103 of the support surface. A cavity, located at the inner sides of the plurality of ribbed plates, of the receiving chamber 1101 forms the enriched-gas collection chamber.

The air separation membrane 120 is disposed on the outer side surfaces of the plurality of ribbed plates 1102. It can be recognized by those skilled in the art that inner side surfaces of the plurality of ribbed plates 1102 are side surfaces, facing the receiving chamber 1101, of the ribbed plates 1102 or side surfaces, away from the opening, of the ribbed plates 1102, and the outer side surfaces of the plurality of ribbed plates 1102 are side surfaces, away from the receiving chamber 1101, of the ribbed plates 1102 or side surfaces, facing the opening, of the ribbed plates 1102. Since the air separation membrane 120 is disposed on the outer side surfaces of the plurality of ribbed plates 1102, the support frame 110 well supports the air separation membrane 120, which is favorable for keeping excellent flatness of the air separation membrane 120. In addition, the air separation device 100 having excellent internal gas fluidity and certain strength is provided.

In some embodiments, a surface at the periphery of the opening of the side frame 102 sinks to be flush with the outer side surfaces of the plurality of ribbed plates 1102 so as to form a mounting groove 114 into which the air separation membrane 120 is embedded. The surface at the periphery of the opening of the side frame 102 further sinks at the rim of the mounting groove 114 to form a round of annular groove 115 for being filled with a sealant 130, such that the air separation membrane 120 is mounted in the mounting groove 114 in a sealed manner. Since the mounting groove 114 and the annular groove 115 are formed in the side frame 102 of the support frame 110, the air separation membrane 120 can be conveniently, quickly and reliably mounted on the support frame 110, the air tightness of the air separation device 100 is guaranteed and a sufficient pressure difference is formed inside and outside the air separation membrane 120. When the air separation device 100 provided by the embodiment of the present invention is used for keeping food in a refrigerator fresh, the sealant should meet the food-grade standard. That is, the sealant should not produce peculiar smell or harmful volatile substances.

In some embodiments, referring to FIG. 3, in order to further facilitate mounting, the air separation membrane 120 may be pre-secured into the mounting groove 114 by a round of double-faced adhesive tape 140 first. Then, the annular groove 115 is filled with a round of sealant 130. Thus, the air separation membrane 120 is mounted in the mounting groove 114 in a sealing manner.

In some embodiments, edges of the outer side surfaces of the ribbed plates 1102 are chamfered, such that contact areas between the ribbed plates 1102 and the air separation membrane 120 may be reduced. Hence, the fluidity of the gas inside the enriched-gas collection chamber is further enhanced.

In some embodiments, the air extraction hole 101 is formed in the circumferential side of the side frame 102. It should be understood by those skilled in the art that the term "the circumferential side" herein refers to a circumferential side wall of any side, perpendicular to a plane where the opening of the receiving chamber 1101 is located, of the side frame 102. In such embodiments, an axis of the air extraction hole 101 is parallel to the support surface or the outer side surfaces of the ribbed plates 1102. Further, the axis of the air extraction hole 101 is on a perpendicular bisection plane of the support surface. The term "perpendicular bisection plane" herein refers to a plane, which is perpendicular to the support surface and bisects the support surface. That is, the air extraction hole 101 is formed in the middle of the circumferential side of the side frame 102, which is conductive to uniform gas permeation of all portions of the air separation membrane 120.

The plurality of ribbed plates 1102 is preferably uniformly spaced and extends in the same direction. In some embodiments, the axis of the air extraction hole 101 and the plurality of ribbed plates 1102 extend in the same direction, which means that the channel 1103 of the support surface and the axis of the air extraction hole 101 extend in the same direction. In this way, a gas entering the channel 1103 can quickly flow to the air extraction hole 101. Thus, air circulation inside the enriched-gas collection chamber is quickened, further contributing to increase of the gas separation rate of the air separation device 100.

Referring to FIG. 4, the air extraction hole 101 can protrude outwards from the support surface. The air extraction hole 101 faces two of the plurality of ribbed plates 1102. That is, a projected outline of a cross section of the air extraction hole 101 on the plane perpendicular to the axis of the air extraction hole 101 at least partially overlaps a projected outline of a cross section of any of the two ribbed plates 1102 on the plane perpendicular to the axis of the air extraction hole 101. The outer side surfaces, close to the air extraction hole 101, of the two ribbed plates 1102 are upraised outwards to form bulges 1104. The two bulges 1104 form a flow guide channel aligned with the air extraction hole 101 to increase air inflow of the air extraction hole 101. In such embodiments, the two bulges 1104 upraise corresponding regions of the air separation membrane 120, such that the flow guide channel communicated with the air extraction hole 101 is formed on the outer sides of the ribbed plates 1102, and the air guiding rate is further increased. In such embodiments, the spacing between the bottom wall of the receiving chamber 1101 and the inner side surfaces of the ribbed plates 1102 may be very small, and only a gap is required. Thus, the size of the enriched-gas collection chamber can be greatly reduced, which contributes to minimization of the air separation device 100.

The air extraction hole 101 may be a stepped hole or a ladder hole, such that when it is connected to the air pump through a hose, the air tightness at their connection portion is guaranteed.

In an alternative embodiment, an angle may be formed between the extending direction of the plurality ribbed plates 1102 and the extending direction of the axis of the air extraction hole 101.

In the embodiment of the present invention, it may be guaranteed that the support frame 110 has sufficient strength due to its special structure. Thus, the support frame 110 may be made of plastics. The air separation device 100 provided by the embodiment of the present invention is mainly used for separation of air compositions. When the air separation membrane 120 is the oxygen-enriching membrane, the air separation device 100 can adjust the content of oxygen or nitrogen or carbon dioxide in air and thus is applicable to different application scenarios (e.g., an oxygen-rich environment; a low-oxygen environment for a respirator, freshness-keeping or heavy-oxygen-enriched water; an air-conditioning freshness-keeping or flame-retardant environment; a nitrogen-rich environment; and a carbon-dioxide-rich environment). The air separation device 100 provided by the embodiment of the present invention is very suitable for freshness-keeping of food in a refrigerator due to a relatively small size.

Figure 5:
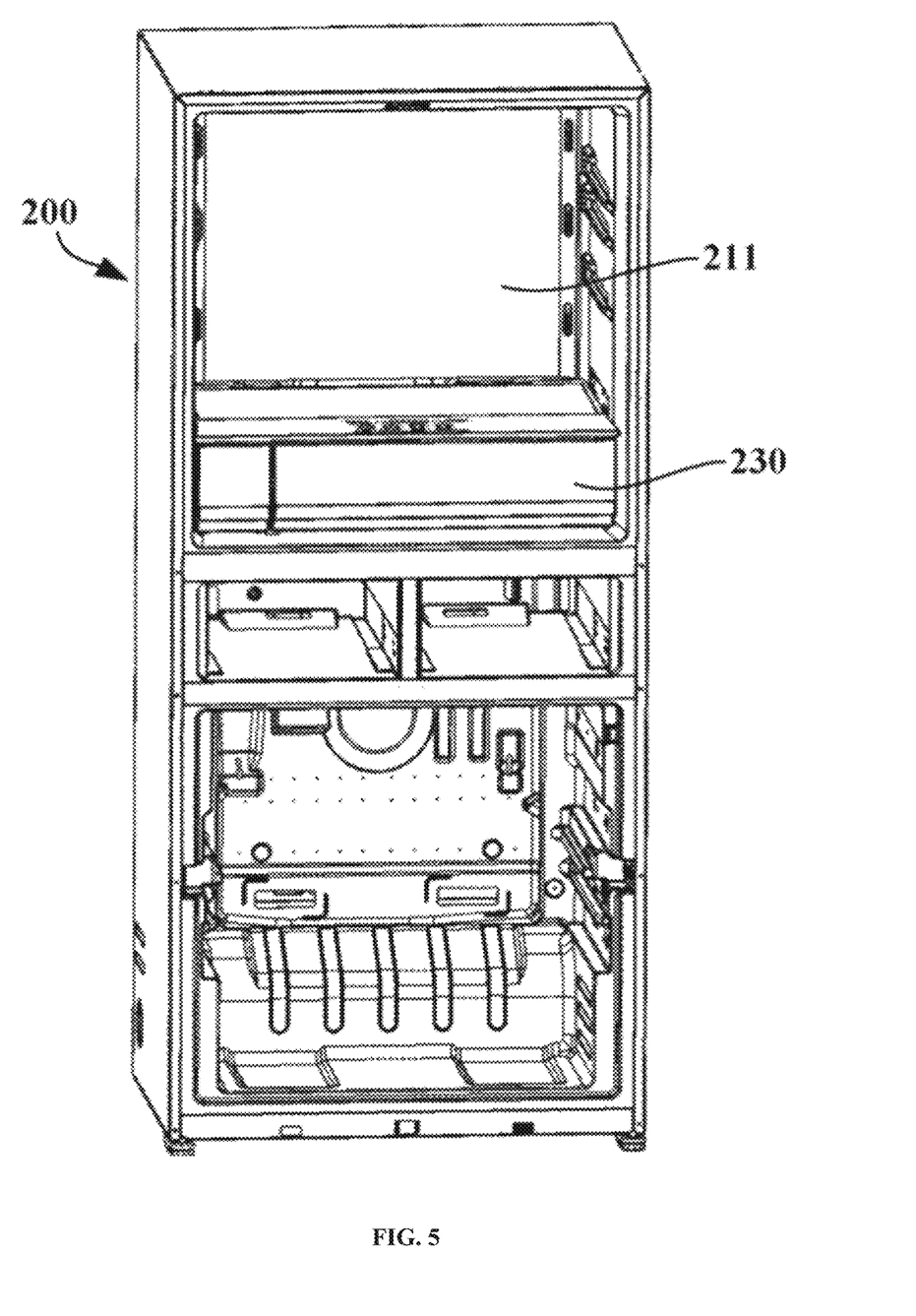
FIG. 5 is a schematic layout structural view of a refrigerating and freezing device according to one embodiment of the present invention.
Figure 6:
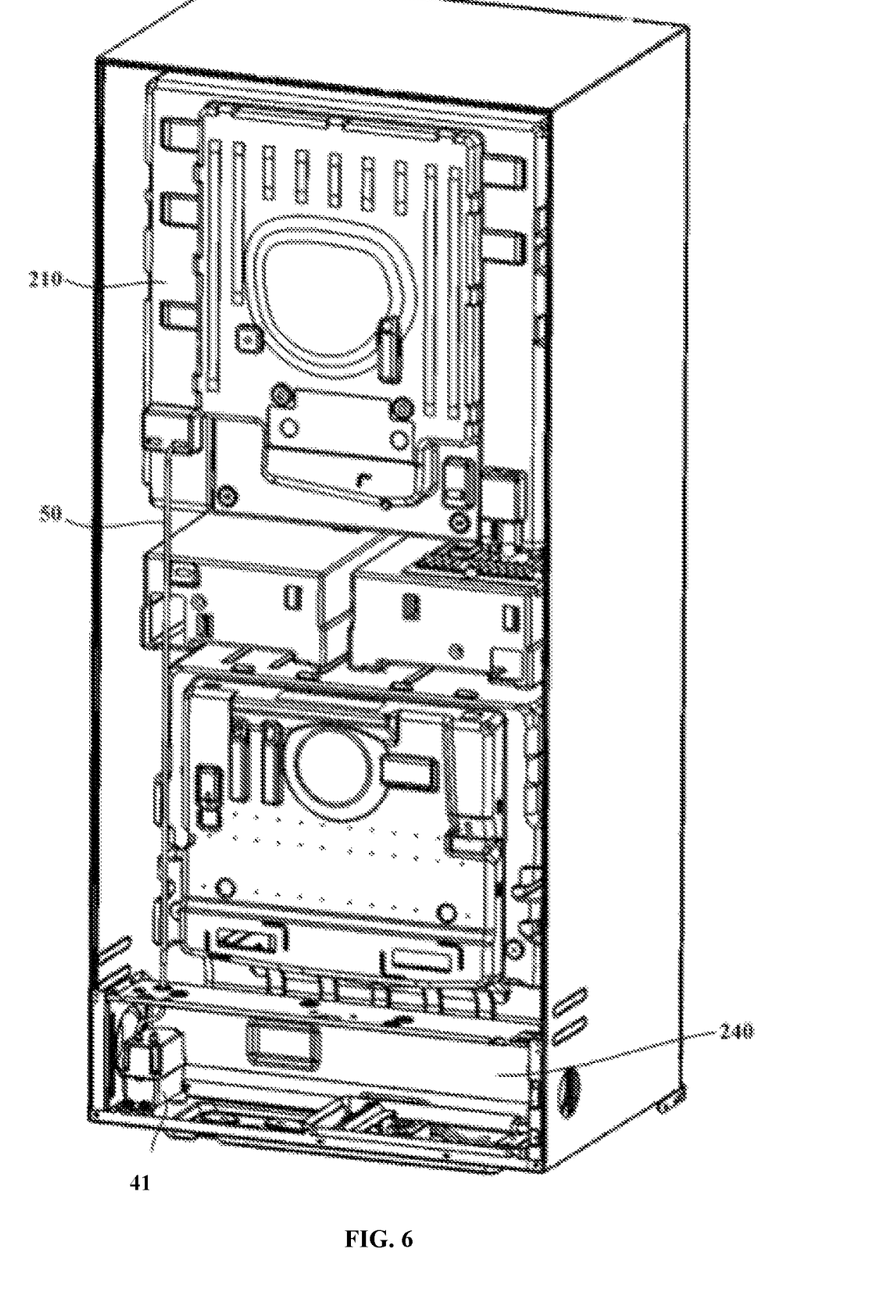
FIG. 6 is a schematic structural view of the refrigerating and freezing device shown in FIG. 5 and observed from another perspective.
Figure 7:
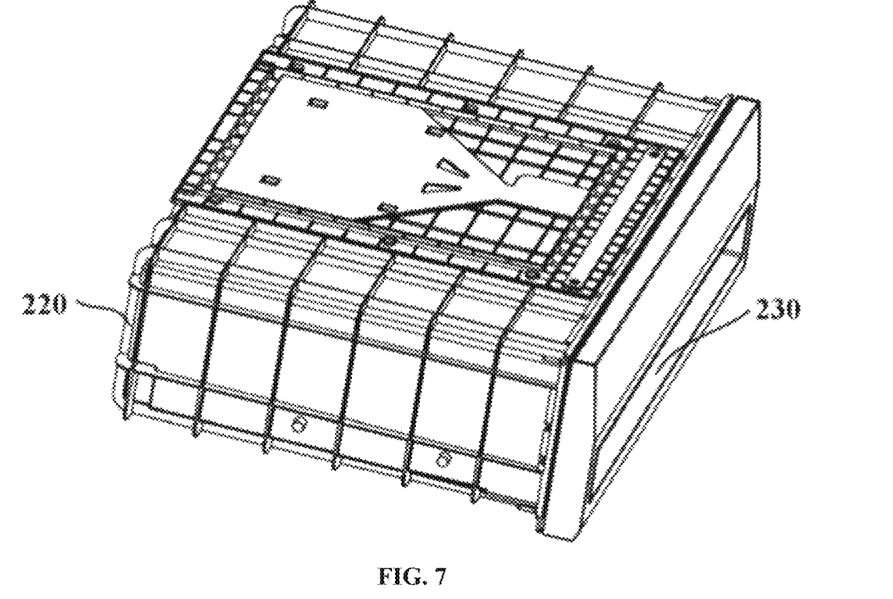
FIG. 7 is a schematic local structural view of a refrigerating and freezing device according to one embodiment of the present invention.
Figure 8:
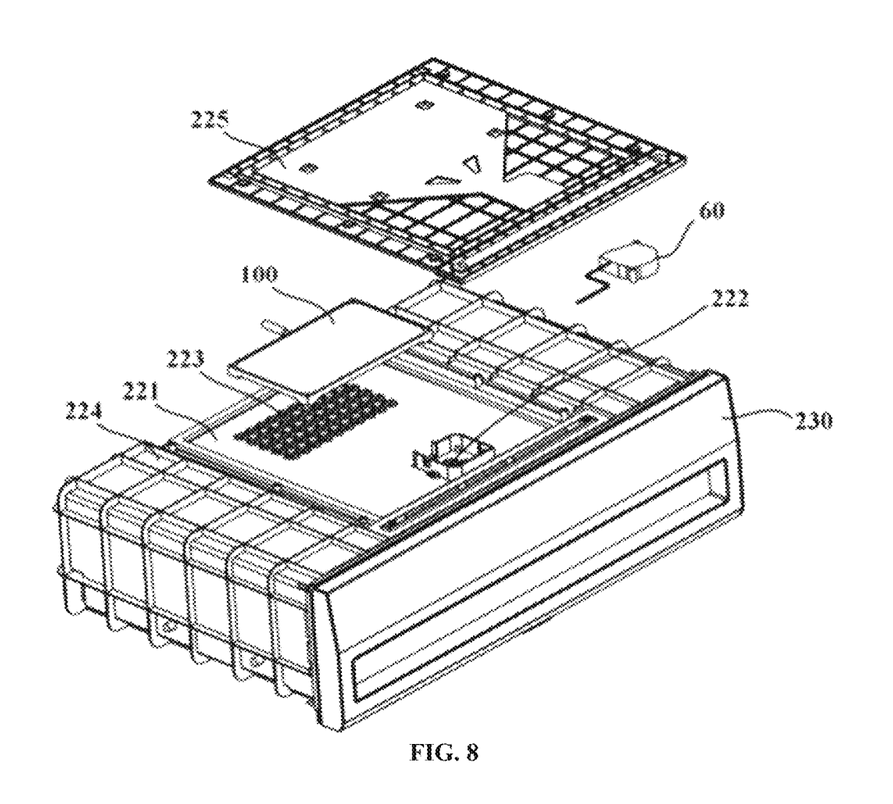
FIG. 8 is a schematic exploded view of the structure shown in FIG. 7.

Therefore, the present invention further provides a refrigerating and freezing device. FIG. 5 is a schematic structural view of a refrigerating and freezing device according to one embodiment of the present invention. FIG. 6 is a schematic structural view of the refrigerating and freezing device shown in FIG. 5 and observed from another perspective. FIG. 7 is a schematic local structural view of the refrigerating and freezing device according to one embodiment of the present invention. FIG. 8 is a schematic exploded view of the structure shown in FIG. 7. As shown in FIGS. 5-8, the refrigerating and freezing device provided by the embodiment of the present invention may include a cabinet 200, a door body (not shown), the air separation device 100, an air pump 41 and a refrigerating system.

A storage space 211 and a compressor compartment 240 are defined in the cabinet 200. In particular, the cabinet 200 may include an inner container 210 with the storage space 211 defined therein. The door body is rotatably mounted on the cabinet 200 and configured to open or close the storage space 211 defined in the cabinet 200. Further, a storage container with an air-conditioning freshness-keeping space therein is disposed in the storage space 211. The air-conditioning freshness-keeping space may be a closed space or an approximately closed space. The storage container is preferably a drawer component. The storage container may include a drawer barrel 220 and a drawer body 230. The drawer barrel 220 may be provided with a forward opening and is disposed in the storage space 211. The drawer body 230 is disposed in the drawer barrel 220 in a sliding manner to be operatively withdrawn from and inserted into the drawer barrel 220 from the forward opening of the drawer barrel 220.

The refrigerating system may be a refrigerating circulation system composed of a compressor, a condenser, a throttling device, an evaporator and the like. The compressor may be mounted in the compressor compartment 240. The evaporator is configured to directly or indirectly supply cold into the storage space 211.

The space around the air separation device 100 is communicated with the air-conditioning freshness-keeping space. More of oxygen than nitrogen in air of the air-conditioning freshness-keeping space may enter the enriched-gas collection chamber through the air separation membrane 120. The air pump 41 may be disposed in the compressor compartment 240 to make the best of the space of the compressor compartment 240 without additionally taking up other places, such that the size of the refrigerating and freezing device will not be increased additionally. Thus, the refrigerating and freezing device may be compact in structure. An inlet end of the air pump 41 is communicated with the enriched-gas collection chamber of the air separation device 100 through a pipeline 50 to extract and discharge a gas that permeates into the enriched-gas collection chamber out of the storage container.

In this embodiment, the air pump 41 extracts air outwards, such that pressure of the enriched-gas collection chamber is lower than that of the space around the air separation device 100. Further, oxygen in the space around the air separation device 100 enters the enriched-gas collection chamber. Since the air-conditioning freshness-keeping space is communicated with the space around the air separation device 100, air in the air-conditioning freshness-keeping space will enter the space around the air separation device 100. Thus, oxygen in air of the air-conditioning freshness-keeping space may enter the enriched-gas collection chamber. Hence, a nitrogen-rich oxygen-lean gas atmosphere which facilitates freshness-keeping of food is obtained in the air-conditioning freshness-keeping space.

In some embodiments, as shown in FIG. 7 and FIG. 8, the air separation device 100 may be disposed on a barrel wall of the drawer barrel 220, and preferably, is horizontally disposed at a top wall of the drawer barrel 220. In particular, an accommodation chamber 221 is formed in the top wall of the drawer barrel 220 to accommodate the air separation device 100. At least one first vent 222 and at least one second vent 223 which are formed in a wall between the accommodation chamber 221 of the drawer barrel 220 and the air-conditioning freshness-keeping space. The first vent 222 and the second vent 223 are spaced from each other to respectively communicate the accommodation chamber 221 with the air-conditioning freshness-keeping space in different positions. There may be a plurality of first vents 222 and a plurality of second vents 223, which are all micropores.

In some embodiments, to promote gas circulation between the air-conditioning freshness-keeping space and the accommodation chamber 221, the refrigerating and freezing device may further include a fan 60. The fan 60 is disposed in the accommodation chamber 221 and configured to promote a gas in the air-conditioning freshness-keeping space to enter the accommodation chamber 221 through the first vent 222 and to enable the gas in the accommodation chamber 221 to enter the air-conditioning freshness-keeping space through the second vent 223. The fan 60 is preferably a centrifugal fan disposed at the first vent 222 in the accommodation chamber 221. That is, the centrifugal fan is located above the at least one first vent 222, and has an air inlet right facing the first vent 222 and an air outlet that may face the air separation device 100. The air separation device 100 is disposed above the at least one second vent 223 and has the air separation membrane 120 parallel to the top wall of the barrel 22. The air separation membrane 120 may be disposed facing the air-conditioning freshness-keeping space. The first vent 222 may be formed in the front part of the top wall. The second vent 223 may be formed in the rear part of the top wall. That is, the centrifugal fan is disclosed at the front part of the accommodation chamber 221. The air separation device 100 is disposed at the rear part of the accommodation chamber 221. Further, the top wall of the drawer barrel 220 may include a main plate portion 224 and a cover plate portion 225. A sunken groove is formed in an upper surface of the main plate portion 224. The cover plate portion 225 covers the sunken groove to form the accommodation chamber 221.

So far, those skilled in the art should realize that although the present description illustrates and describes various exemplary embodiments of the present invention, many other variations or modifications conforming to the principle of the present invention can be determined directly or derived based on the content disclosed by the present invention, without departing from the spirit and scope of the present invention. Therefore, the scope of the present invention should be understood and considered to have covered all these variations or modifications.

What is claimed is:

1. An air separation device, comprising:
a support frame on which a support surface with a channel and an enriched-gas collection chamber communicated with the channel are formed; and
an air separation membrane laid on the support surface of the support frame and configured to enable more of a specific gas than other gases in airflow of a space around the air separation device to enter the enriched-gas collection chamber through the air separation membrane;
wherein the support frame comprises:
an air extraction hole communicated with the enriched-gas collection chamber to allow the specific gas in the enriched-gas collection chamber to be output;
a side frame in which a receiving chamber having an opening is defined; and
a plurality of ribbed plates disposed at intervals at the opening of the receiving chamber; wherein outer side surfaces of the plurality of ribbed plates form the support surface, and edges of the outer side surfaces of the ribbed plates are chamfered;
a gap between two adjacent ribbed plates forms the channel; and
a cavity, located at the inner sides of the plurality of ribbed plates, of the receiving chamber forms the enriched-gas collection chamber;
wherein the air extraction hole is formed in a circumferential side of the side frame, and an axis of the air extraction hole is on a perpendicular bisection plane of the support surface.

2. The air separation device according to claim 1, wherein:
the axis of the air extraction hole and the plurality of ribbed plates extend in the same direction.

3. The air separation device according to claim 2, wherein:
the axis of the air extraction hole and inner side surfaces of the plurality of ribbed plates are located on the same plane.

4. The air separation device according to claim 1, wherein:
the air extraction hole protrudes outwards from the support surface;
the air extraction hole is opposite to two of the ribbed plates; and the outer side surfaces, close to the air extraction hole, of the two ribbed plates are upraised outwards to an upraising extent different from the outer side surfaces of others of the ribbed plates to respectively form two bulges, and the two bulges form a flow guide channel aligned with the air extraction hole to increase air inflow of the air extraction hole.

5. The air separation device according to claim 1, wherein:
a surface at the periphery of the opening of the side frame sinks to be flush with the support surface so as to form a mounting groove into which the air separation membrane is embedded; and
the surface at the periphery of the opening of the side frame further sinks at the rim of the mounting groove to form a round of annular groove for being filled with a sealant, such that the air separation membrane is mounted in the mounting groove in a sealed manner.

6. The air separation device according to claim 1, wherein the air separation membrane is an oxygen-enriching membrane, and the specific gas is oxygen.

7. A refrigerating and freezing device, comprising:
a cabinet with a storage space defined therein, wherein an air-conditioning freshness-keeping space is formed in the storage space;
the air separation device of claim 6, the space around which is communicated with the air-conditioning freshness-keeping space; and
an air pump of which an inlet end is communicated with the enriched-gas collection chamber of the air separation device through a pipeline to extract and discharge a gas that permeates into the enriched-gas collection chamber out of the air-conditioning freshness-keeping space.

8. The air separation device according to claim 5, wherein the air separation membrane is pre-secured into the mounting groove by a round of double-faced adhesive tape first, then the annular groove is filled with a round of sealant.

* * * * *